United States Patent [19]

Ikeda

[11] Patent Number: 4,614,243
[45] Date of Patent: Sep. 30, 1986

[54] COMBINATORIAL WEIGHING MACHINE AND METHOD OF CONTROLLING THE SAME

[75] Inventor: Tetsuo Ikeda, Ohtsu, Japan

[73] Assignee: Kabushiki Kaisha Ishida Koki Seisakusho, Kyoto, Japan

[21] Appl. No.: 660,103

[22] Filed: Oct. 12, 1984

[30] Foreign Application Priority Data

Oct. 15, 1983 [JP] Japan ................. 58-192988

[51] Int. Cl.⁴ ............. G01G 19/22; G01G 21/28; G01G 13/16
[52] U.S. Cl. ...................... 177/25; 177/1; 177/58; 177/59
[58] Field of Search ............. 177/1, 25, 58, 59

[56] References Cited

U.S. PATENT DOCUMENTS

| 4,308,928 | 1/1982 | Oshima | 177/25 |
| 4,418,771 | 12/1983 | Henry et al. | 177/25 X |
| 4,437,527 | 3/1984 | Omae et al. | 177/25 |
| 4,511,009 | 4/1985 | Kataoka | 177/1 |

Primary Examiner—George H. Miller, Jr.
Attorney, Agent, or Firm—Staas & Halsey

[57] ABSTRACT

A combinatorial weighing apparatus includes a plurality of weighing machines for weighing supplied articles, and a plurality of storage hoppers for storing articles weighed and supplied respectively by the weighing machines, a computer determines an optimum weight combination through combinatorial computations based on weight data items corresponding to the articles charged in the storage hoppers respectively from the weighing machines, controls the storage hoppers to discharge the articles, and supplies the weighing machines with new articles.

16 Claims, 9 Drawing Figures

COMBINATORIAL WEIGHING MACHINE AND METHOD OF CONTROLLING THE SAME

BACKGROUND OF THE INVENTION

The present invention relates to a combinatorial weighing machine and a method of controlling the same.

Combinatorial weighing is carried out by supplying articles to weighing hoppers associated with a number of weighing machines, effecting combinatorial computations on weight values from the weighing machines, selecting an optimum weight combination having a combinatorial total weight equal or closest to a target weight value, and opening the weighing hoppers of weighing machines giving that optimum weight combination to produce a collection of articles having a total weight equal or closest to the target weight. The weighing hoppers of the weighing machines which are selected as forming the optimum weight combination and from which the articles have been discharged, are supplied with articles again, and combinatorial computations are repeated. However, with such combinatorial weighing, no combinatorial computations are performed when discharging weighed articles from the selected weighing machines and while new articles are being supplied again to the weighing machines after previous articles have been discharged, with the result that the weighing rate is low.

One combinatorial weiging process which has been proposed for increasing the weighing rate is disclosed in Japanese Laid-Open Patent Publication No. 57-86014.

According to the proposed process, about 15 weighing machines are available, and 10 or fewer weighing machines are used in each cycle of combinatorial computations. If 5 weighing machines are selected as forming an optimum weight combination, then a next cycle of combinatorial computations is effected among 10 weighing machines (the 5 weighing machines not selected as giving the optimum weight combination and the 5 weighing machines not used in the previous combinatorial compuations). During this next cycle, the articles are discharged from the 5 weighing machines selected in the present cycle and articles are thereafter supplied again to the emptied weighing machines. This process is called a parallel weighing cycle.

However, in the above process, about 5 extra weighing machines must be provided for a next combinatorial weighing cycle in addition to the 10 weighing machines which are in use for a current combinatorial weighing cycle. The disclosed process therefore requires an overall apparatus of larger size than standard apparatus with only 10 weighing machines. The large-size apparatus has a large number of parts, is costly, and requires a large installation space.

SUMMARY OF THE INVENTION

It is an object of the present invention to provide a combinatorial weighing apparatus and a method of controlling the same, which are capable of performing a high-speed weighing operation without requiring extra weighing machines.

According to the present invention, there is provided a combinatorial weighing apparatus comprising a plurality of weighing machines for weighing supplied articles, a plurality of storage hoppers for storing articles weighed and supplied respectively from the weighing machines, and a control means for determining an optimum weight combination through combinatorial computations based on weight data items corresponding to on the articles charged in the storage hoppers respectively from the weighing machines, for controlling the storage hoppers to discharge the articles, and for supplying the weighing machines with new articles.

Further according to the present invention, there is provided a method of controlling a combinatorial weighing apparatus, comprising the steps of effecting combinatorial computations based corresponding to weight data items on articles charged in storage hoppers to determine an optimum weight combination with a combinatorial total weight equal to a target weight value or closest thereto within an allowable preset range, controlling the storage hoppers selected as forming the optimum weight combination to discharge the articles therefrom, controlling the weighing machines to charge weighed articles into the storage hoppers from which the articles have been discharged, and supplying new articles to the weighing machines from which the weighed articles have been supplied to the storage hoppers.

With the present invention, the storage hoppers which have been selected as giving an optimum weight combination and from which articles have been discharged are immediately supplied with weighed articles from weighing machines. Therefore, no empty storage hoppers are left, and all of the storage hoppers are available for combinatorial computations at all times, so that the articles can be weighed with stable weighing accuracy. Furthermore, since articles weighed by weighing machines are stored in storage hoppers, once the weighing machines have weighed the articles can immediately enter a next weighing cycle. As a consequence, the availability of the weighing machines is increased, and the number of weighing machines used is reduced. The weighing apparatus is small in size as a whole, and can be manufactured at a low cost.

The above and other objects, features and advantages of the present invention will become more apparent from the following description when taken in conjunction with the accompanying drawings, in which preferred embodiments of the present invention are shown.

DESCRIPTION OF THE PREFERRED EMBODIMENTS

Embodiments of the present invention will be described in detail with reference to the drawings.

Figure 1:
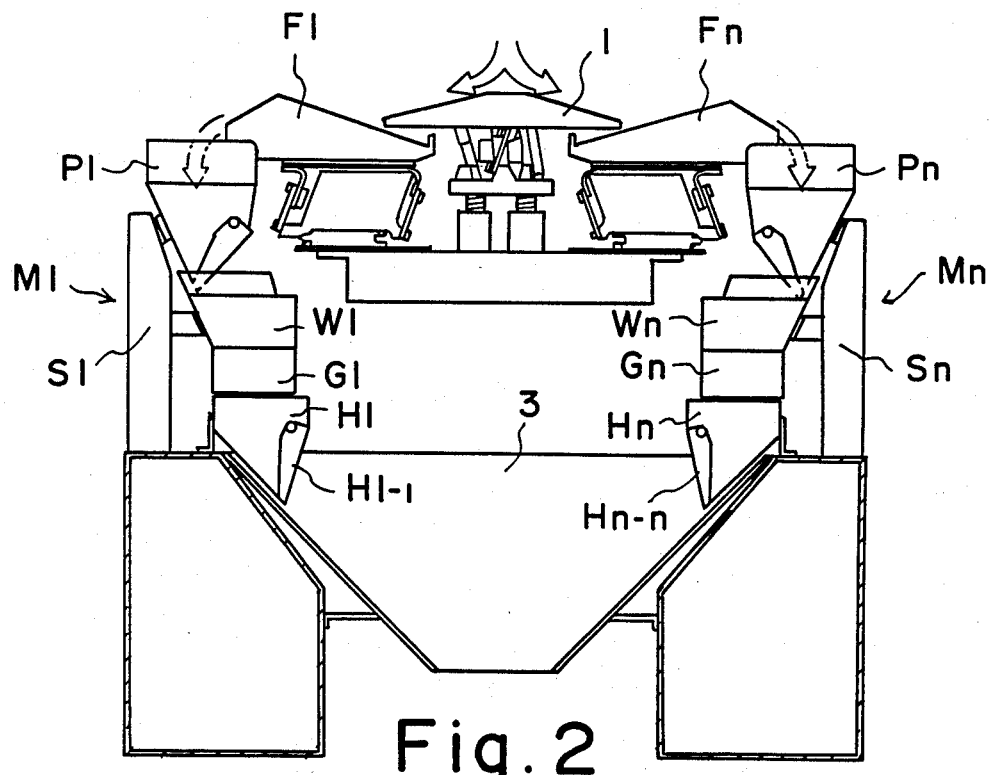
FIG. 1 is a schematic side elevational view of a combinatorial weighing apparatus according to an embodiment of the present invention.

FIG. 1 schematically shows a combinatorial weighing apparatus of the present invention. The combinatorial weighing apparatus includes a distribution table 1 for distributing articles which have been dropped from a supply conveyor (not shown) radially outwardly into supply feeders F1, . . . , Fn. The distribution table 1 is of the known vibratory feed type and can be vibrated for a certain period of time for supplying articles into the supply feeders F1, . . . , Fn. The supply feeders F1, . . . , Fn are disposed radially around the distribution table 1 and are vibratable by known electric vibrators for feeding articles supplied from the distribution table 1 into pool hoppers P1, . . . , Pn. The pool hoppers P1, . . . , Pn are disposed radially outwardly and downwardly of the supply feeders F1, . . . , Fn, respectively, and have lower gates. Articles supplied to the pool hoppers P1, . . . , Pn are then supplied into weighing hoppers W1, . . . , Wn of a plurality of weighing machines M1, . . . , Mn. The weighing machines M1, . . . , Mn comprise the weighing hoppers W1, . . . , Wn, and weight detectors S1, . . . , Sn connected respectively thereto. The weighing hoppers W1, . . . , Wn have lower discharge gates G1, . . . , Gn which can independently be swung open laterally in opposite directions. As many storage hoppers H1, . . . , Hn as the number of weighing machines M1, . . . , Mn, are disposed below the discharge gates G1, . . . , Gn and positioned between adjacent ones of the discharge gates G1, . . . , Gn, so that each of the storage hoppers can be charged with articles from either of two adjacent discharge gates. The storage hoppers H1, . . . , Hn have lower gates H1-1, . . . , Hn-n, respectively. A collection chute 3 is located below the storage hoppers H1, . . . , Hn for collecting articles discharged from the storage hoppers H1, . . . , Hn giving an optimum weight combination, toward a lower central position. In the illustrated embodiment, the collection chute 3 is of an inverted conical shape. However, there may be employed a chute having guide grooves for guiding articles as they slide down, or a chute having two separate discharge passages. Where the chute with the separate discharge passages is used, each of the discharge gates of the storage hoppers H1, . . . , Hn should have gate doors which can be swung open laterally in opposite directions, so that the gate doors will be opened and closed selectively to discharge articles into the respective discharge passages on the chute.

Figure 2:
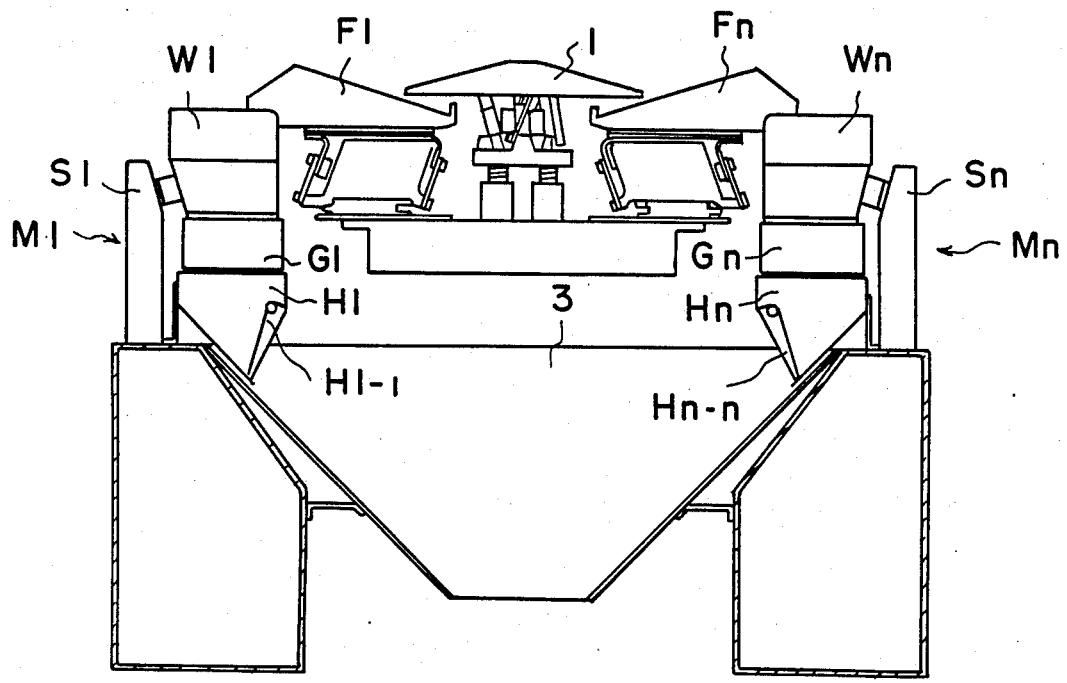
FIG. 2 is a schematic side elevational view of a combinatorial weighing apparatus according to another embodiment of the present invention.

FIG. 2 is schematically illustrative of a combinatorial weighing apparatus according to another embodiment of the present invention. The combinatorial weighing apparatus of FIG. 2 is different from the apparatus of FIG. 1 in that there are no pool hoppers, (designated at P1, . . . , Pn in FIG. 1), and articles are supplied from the supply feeder F1, . . . , Fn directly into the weighing hoppers W1, . . . , Wn of the weighing machines M1, . . . , Mn.

Figure 3:
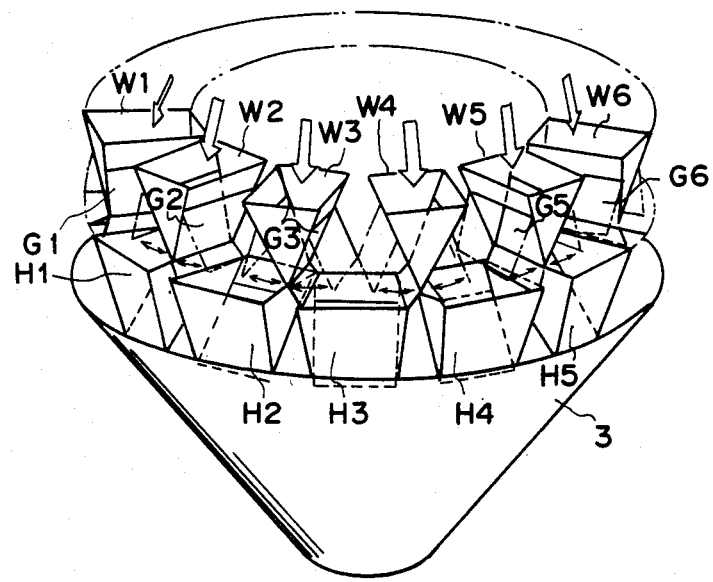
FIG. 3 is a perspective view of the arrangement of weighing hoppers and storage hoppers in the combinatorial weighing apparatus of FIGS. 1 and 2.
Figure 5:
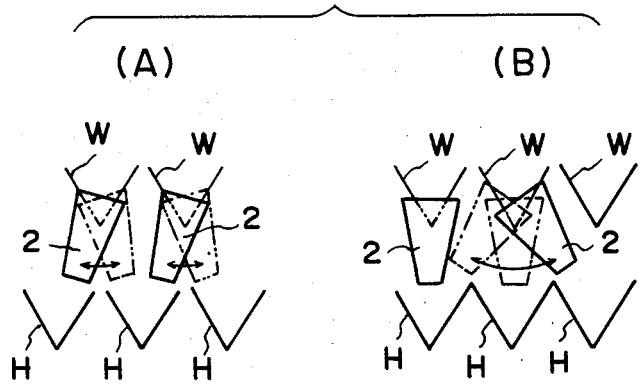
FIGS. 5(A) and (B) are schematic views showing weighing hoppers and storage hoppers according to a still further embodiment of the present invention.

FIG. 3 is a perspective view of the weighing hoppers and the storage hoppers in the combinatorial weighing apparatus shown in FIGS. 1 and 2. The weighing hoppers W1-Wn are disposed at spaced locations such that the gates G1-Gn thereof which open laterally in opposite directions, are positioned in confronting relation. The storage hoppers H1-Hn are disposed below the weighing hoppers W1-Wn for receiving articles from either of two adjacent ones of the weighing hoppers W1-Wn. The storage hoppers H1-Hn are thus arranged so that articles can be supplied into each of the storage hoppers H1-Hn from at least two of the weighing hoppers W1-Wn. As another arrangement, as shown in FIGS. 5(A) and (B), each weighing hopper W can have a distribution chute 2 below a discharge port of the weighing hopper for selectively supplying weighed articles into a plurality of storage hoppers H.

Figure 4:
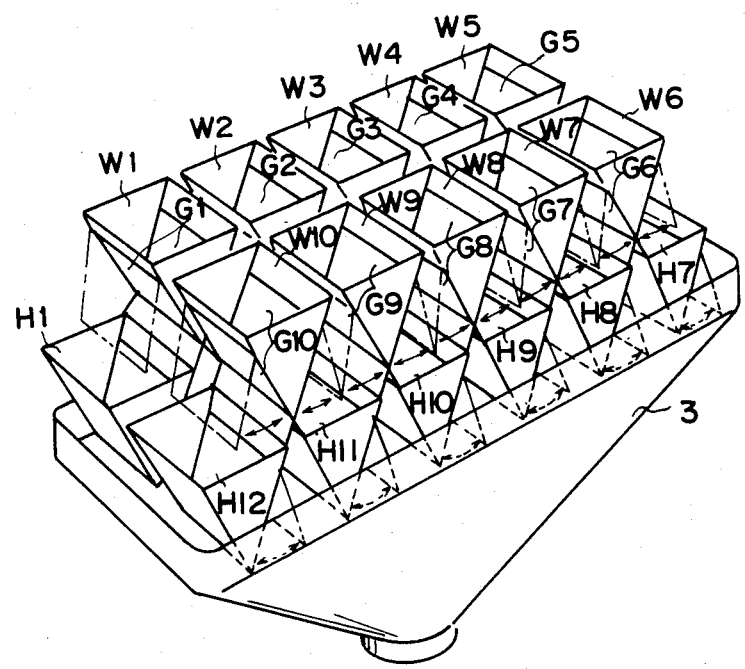
FIG. 4 is a perspective view of an arrangement of weighing hoppers and storage hoppers according to still another embodiment of the present invention.

FIG. 4 shows an alternative arrangement in which a total of 12 storage hoppers H1, . . . , Hn are disposed in two parallel straight rows below weighing hoppers W1, . . . , W10. The weighing hoppers W1-W10 are disposed in spaced intervals such that discharge gates of the adjacent weighing hoppers W1-W10 are positioned in confronting relation. The storage hoppers H1-H12 are located below the weighing hoppers W1-W10 for receving articles from either of the adjacent two of the weighing hoppers W1-Wn.

Figure 6:
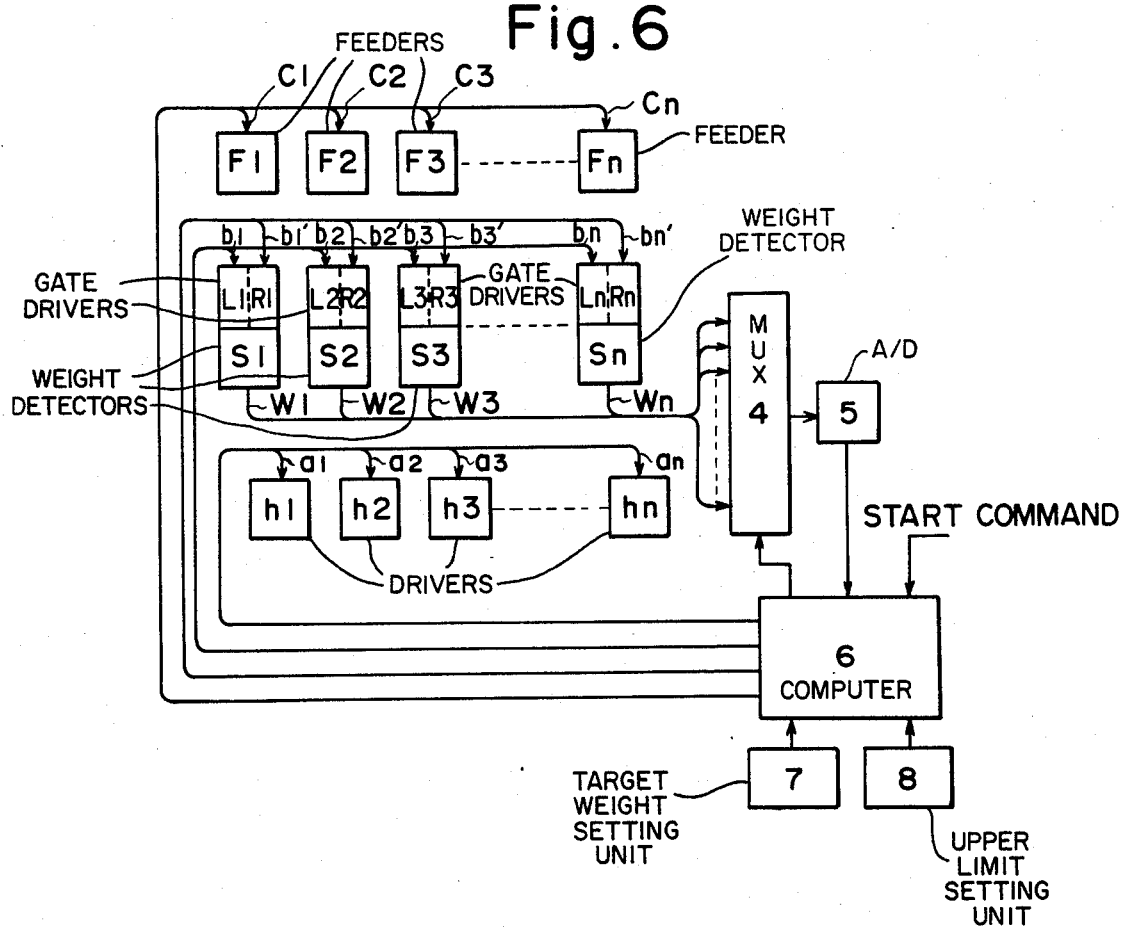
FIG. 6 is a block diagram of a control circuit for the combinatorial weighing apparatus illustrated in FIG. 2.

FIG. 6 shows in block form a control system for the combinatorial weighing apparatus illustrated in FIG. 2. The control system includes a multiplexer 4 for successively applying weight signals W1-Wn from the weight detectors S1-Sn to an A/D converter 5 which converts the applied signals into digital signals that will be applied to a control means 6.

The control means 6 comprises a computer and is programmed to execute the following control operation. When a start command is issued from a packaging machine (not shown), the control means 6 combines weight data items stored in certain memory areas for articles in the storage hoppers H1-Hn, and determines an optimum weight combination to having a combinatorial total weight value equal to a target weight value or closest thereto withing an allowable preset range. Then, the control means 6 selectively issues operation commands a1-an to drivers h1-hn for the storage hoppers H1-Hn for discharging articles forming the optimum weight combination from the storage hoppers.

The control means 6 next determines the weighing machines for discharging weighed articles into empty storage hoppers from which articles have been discharged, reads weight data items W1-Wn from the determined weighing machines, and stores the weight data items in the above memory areas. Then, the control means 6 issues operation commands b1-bn, b1'-bn' to gate drivers corresponding to the empty storage hoppers among gate drivers L1-Ln, R1-Rn of the determined weighing machines to charge weighed articles from the determined hoppers W1-Wn into the empty ones of the storage hoppers H1-Hn. The control means 6 then selectively issues operation commands C1-Cn to supplied feeders F1-Fn corresponding to the empty weighing hoppers W1-Wn to supply new articles into the weighing hoppers W1-Wn.

Where the apparatus of FIG. 1 is to be controlled, a control mode is added for opening and closing the gates of the pool hoppers P1-Pn. Designated in FIG. 6 at 7 is a target weight setting unit for setting a target weight value, and 8 is an upper limit setting unit for setting an upper limit of an allowable range of combinatorial total weight values.

The weighing method of the present invention will be described in greater detail with reference to the timing chart of FIG. 7 and the operation diagram of FIGS. 8(1) through (6). The method will be described with reference to a weighing apparatus as shown in FIG. 2 in which no pool hoppers are provided and 10 weighing machines and 10 storage hoppers are available.

(1) Since all hoppers are empty at first, the weighing machines M1–M10 are supplied with articles simultaneously. At a time T0 when measured weights are stabilized, the control unit 6 reads weight data from the weighing machines M1–M10 and stores the weight data in certain memory areas. Then, all storage hoppers H1–H10 are charged with weighed articles from the weighing machines M1–M10, and new articles are supplied into empty weighing machines M1–M10. FIG. 8(1) shows the condition in which such a second supply of articles has been completed.

Figure 7:
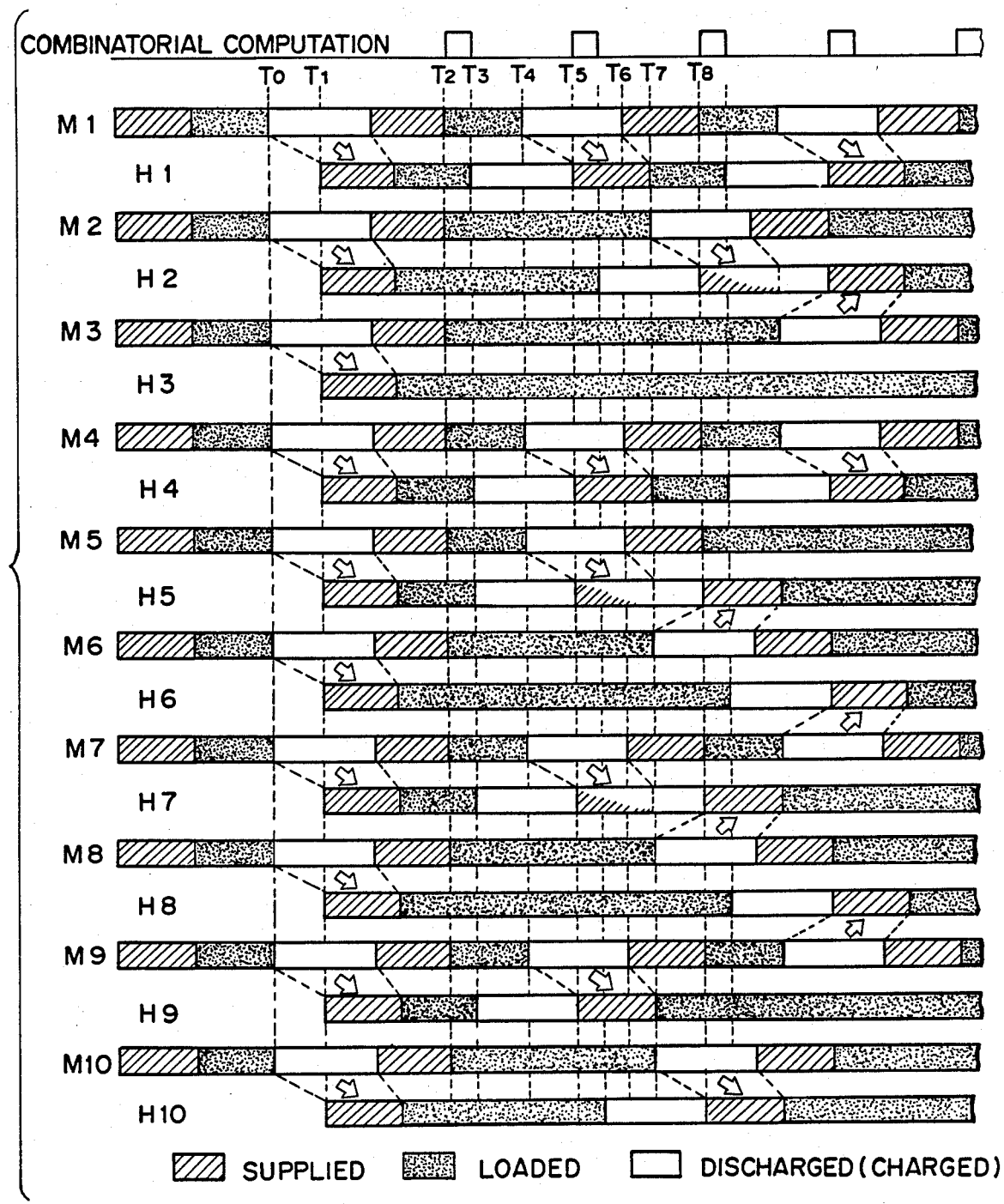
FIG. 7 is an operation timing chart for describing a method according to the present invention.

Hatched areas in FIG. 7 indicate a supply or charge of articles to the weighing hoppers of the weighing machines M1–M10 and the storage hoppers H1–H10. Black areas indicate the loading of articles in the hoppers, and white areas indicate a discharge of articles from the hoppers. There is a slight difference in time between the time T0 for starting to discharge articles from the weighing machines M1–M10 and a time T1 for starting to receive articles in the storage hoppers H1–H10, because of a time required for the articles to fall by gravity.

(2) The control means 6 effects a first combinatorial computation at a time T2 when the second supply of articles is charged in the weighing machines M1–M10. The combinatorial computation is effected on the basis of the article weight data items which have been stored, based on the weight of the articles in the storage hoppers H1–H10. Then, if the 1st, 4th, 5th, 7th, and 9th storage hoppers H1, H4, H5, H7, H9 are selected as forming an optimum weight combination at a time T3, then articles are immediately discharged from these storage hoppers. FIG. 8(2) illustrates this condition.

(3) The control means 6 determines weighing machines which are to charge weighed articles into the empty storage hoppers H1, H4, H5, H7, H9 until a time T4 for starting to discharge weighed articles from the selected weighing machines. If the 1st, 4th, 5th, 7th, and 9th weighing machines M1, M4, M5, M7, M9 are determined as such weighing machines, then weight data items are read from these weighing machines by the control means 6 at a time T4 when weighing in the weighing machines is stabilized. Then, the read-out data items are stored in the memory areas, and weighed articles are discharged from the weighing machines M1, M4, M5, M7, M9 into the empty storage hoppers H1, H4, H5, H7, H9. This condition is illustrated in FIG. 8(3).

(4) Thereafter, the control means 6 effects a second combinatorial computation starting at a time T5 when the charged articles reach the empty storage hoppers. If as a result, the 2nd, 5th, 7th, and 10th storage hoppers H2, H5, H7, H10 are selected as forming an optimum weight combination, then the articles are immediately discharged from these storage hoppers. At this time, there is no time difference between the charging and discharging of articles for the 5th and 7th storage hoppers H5, H7 as shown in FIG. 7, and hence articles discharged from the weighing machines are discharged without being stored in the storage hoppers H5, H7.

(5) The empty weighing machines M1, M4, M5, M7, M9 start being supplied with new articles at a time T6 when the discharge gates are closed. Subsequently, weighing machines are determined for charging weighed articles into the empty storage hoppers H2, H5, H7, H10 until a time T7 when the weighed articles start being charged. FIG. 8(4) is illustrative of operation from the time T6 to the time T7.

Figure 8:
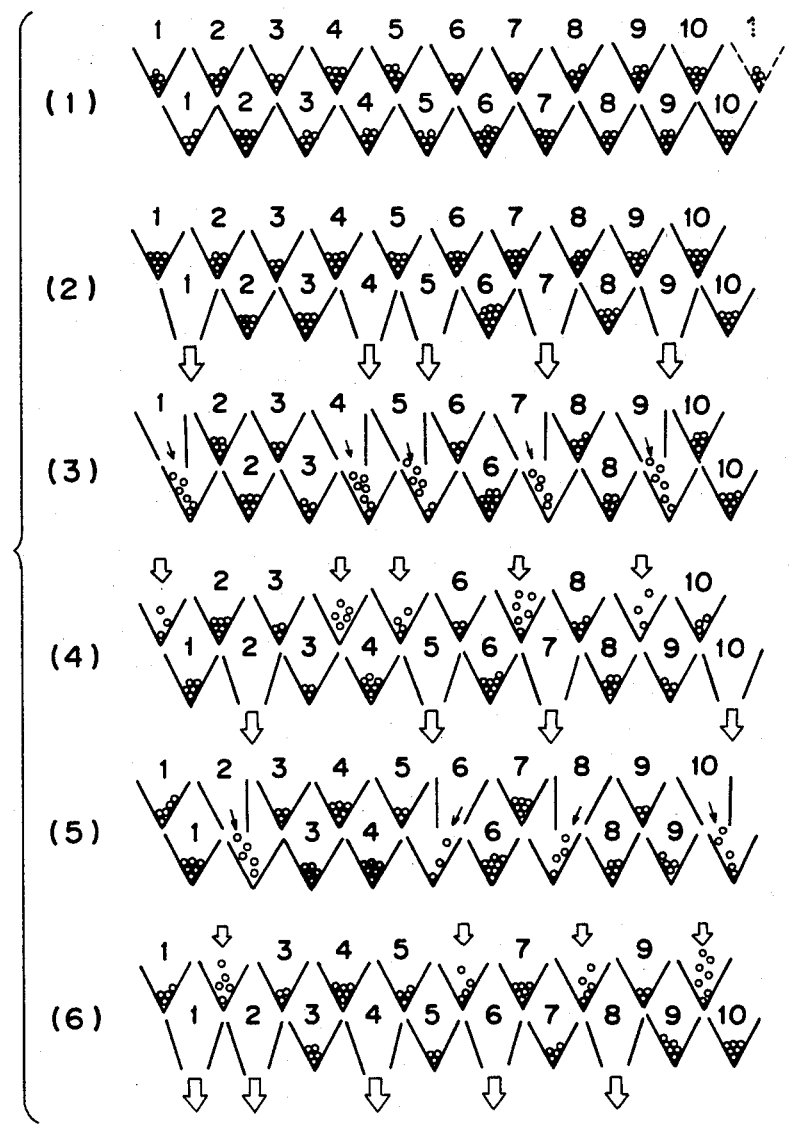
FIGS. 8(1) through (6) are diagrams for illustrating the manner in which weighing hoppers and storage hoppers operate according to the timing chart of FIG. 7.

(6) Under this condition, the 2nd and 3rd weighing machines M2, M3 can be weighing machines for charging weighed articles into the second storage hopper H2, and the 6th, 8th, and 10th weighing machines M6, M8, M10 can be weighing machines for charging weighed articles into the other storage hoppers H5, H7, H10 (FIG. 8(4). If the 2nd, 6th, 8th, and 10th weighing machines are elected as weighing machines for charging articles next, the control means 6 reads weight data items from these weighing machines at the time T7 when weighing in these weighing machines is stabilized. Then, these weight data items are stored in the memory areas, and weighed articles are charged from the weighing machines M2, M6, M8, M10 into the empty storage hoppers H2, H5, H7, H10, as shown in FIG. 8(5).

(7) The control means 6 effects a third combinatorial computation at a time T8 when recharged articles reach the empty storage hoppers. If as a result the 1st, 2nd, 4th, 6th, and 8th storage hoppers H1, H2, H4, H6, and H8 are selected as giving an optimum weight combination, then articles are immediately discharged from these storage hoppers. Next new articles are supplied to the empty weighing machines M2, M6, M8, and M10. FIG. 8(6) shows this condition. A similar process is repeated to carry out successive weighing cycles.

Figure 9:
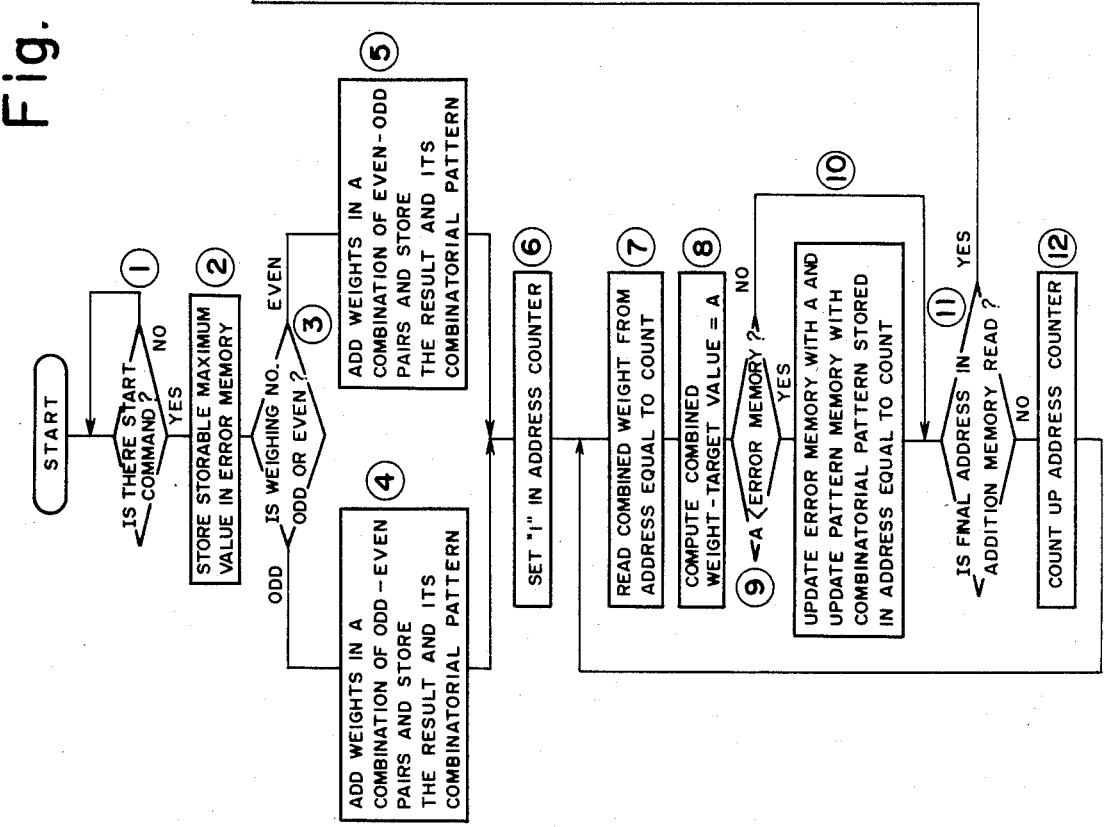
FIG. 9 is a flowchart of a program for executing the method of the present invention.

FIG. 9 is a flowchart of a program for executing the above weighing operation within the control means 6. The flowchart of FIG. 9 will now be described. The control means 6 repeats a checking process in a step (1) while waiting for a start command from a packaging machine (not shown). When a start command is received, then the control means 6 stores a storable maximum value, for example, in an error memory or sets all bits in the error memory to "1" in a step (2). The error memory is provided for finding one weight combination in which the difference between a combinatorial total weight value and a target weight value is minimum within an allowable preset range.

Next, the control means 6 determines whether the number of weighing cycles is odd or even in a step (3). If odd, then the program goes to a step (4) to effect all combinatorial additions in a combination of odd-even pairs, and store the result and is combinatorial pattern in an addition memory. If even, then the program goes to a step (5) to effect all combinatorial additions in a combination of even-odd pairs, and store the result and its combinatorial pattern in the addition memory. Such a branch process is effected to perform each weighing operation smoothly. More specifically, in the apparatus shown in FIGS. 1 through 4, when two adjacent storage hoppers H2, H3 are successively selected simultaneously as an optimum combination, then either one of the two storage hoppers may be rendered incapable of being supplied with articles again in the subsequent supplying operation. To avoid this problem, if the number of weighing cycles is odd, then a combinatorial computation is effected in a combination allowing odd-to-even pairs (such as 1st, 2nd; 5th, 6th; 9th, 10th;

among combinations of adjacent storage hoppers (However, any combination of three or more adjacent storage hoppers is inhibited since one of such storage hoppers would tend to be supplied with articles again in subsequent weighing operation). If the number of weighing cycles is even, then a combinatorial computation is effected in a combination allowing even-to-odd pairs (such as 2nd, 3rd; 6th, 7th; 10th, (Any combination of three or more adjacent storage hoppers is inhibited). Although the total number of combinations is reduced in the above arrangement, the number of total combinations will be 728 even with the above limitation, if 12 storage hoppers are available. Therefore, a sufficient weighing accuracy can be maintained with a smaller number of weighing machines than would be with conventional apparatus.

After the above process has been finished, the control means 6 sets an address counter to 37 1" in a step (6), reads out a combinatorial total weight value from an address in the addition memory which is equal to the count in the address counter in a step (7), and executes a computation of [combinatorial total weight—target weight value=A]. Then, the control means 6 compares the result A with the content of the error memory in a step (9). If the result A is smaller than the content of the error memory, then the control means 6 updates the content of the error memory with the result A, and thereafter updates the content of a pattern memory with a combination pattern stored in an address in the addition memory which is equal to the count in the counter in a step (10). If the result A is equal to or greater than the content of the error memory, then the program skips the step (10) and goes to a step (11). The error memory, the addition memory, and the pattern memory referred to above are all contained in the control means 6.

The control means 6 then checks to determine if the content of a final address in the addition memory has been read out in the step (11). If not, then the address counter is counted up in a step (12), and the program returns to the step (7). This loop is repeated until the content of the final address in the addition memory is read out, or until all combination patterns are executed. When the loop process is completed, the control means 6 rechecks to see if the value stored finally in the error memory falls within a preset allowable range in a step (13). If the stored value is outside of the allowable range, then the program goes to a step (14) for additionally supplying articles into suitable storage hoppers. If within the range, then the control means 6 issues a discharge command to the storage hoppers forming the optimum combination and stored in the pattern memory in a step (15).

Next, the control means 6 determines whether the number of weighing cycles is odd or even in a step (16). If odd, then the control means 6 reads weight data items from those weighing machines which are selected to charge articles into the storage hoppers among from the odd-numbered weighing machines, in a step (17). The control means 6 then stores the weight data items into given memory areas, and issues a discharge command to the weighing machines from which the weight data items have been read, in a step (18). If even, then the control means 6 reads weight data items from those weighing machines which are selected to charge articles into the storage hoppers from among the even-numbered weighing machines, in a step (19). The control means 6 then stores the weight data items into the above memory areas, and issues a discharge command to the weighing machines from which the weight data items have been read, in a step (20). The weighing machines which are to charge articles into the storage hoppers are divided into odd-numbered and even-numbered rows since any number storage hoppers can be charged with articles from substantially half the number of weighing machines, and a parallel weighing cycle is made possible in which when some weighing machines are weighing articles, the other weighing machines are discharging and being supplied with articles.

When the above process is over, the control means 6 increments the number of weighing cycles in a step (21), and then issues an operation command to the supply feeders associated with the weighing machines from which the articles are charged in a step (22), whereupon articles start being supplied into the weighing machines. The program then goes back to the step (1) in which the control means 6 waits for a next start command.

Although certain preferred embodiments have been shown and described, it should be understood that many changes and modifications may be made therein without departing from the scope of the appended claims. For exmaple, each weight data item may be divided by a preset unit weight of an article to convert the weight into a number, so that combinatorial counting utilizing the number of articles or combinatorial counting utilizing the number and weight of articles can be effected by the present invention.

What I claim is:

1. A combinatorial weighing apparatus comprising:
   a plurality of weighing machines for weighing supplied articles and generating weight data items;
   a plurality of storage hoppers, disposed adjacent said plurality of weighing machines, for storing articles weighed and supplied respectively from said weighing machines, each of said weighing machines supplying the weighed articles into at least two of said plurality of storage hoppers, each of said storage hoppers being disposed in associated relation to at least two of said weighing machines, so that each said storage hopper can be charged with weighed articles from any of the associated at least two weighing machines; and
   control means for determining an optimum weight combination by performing combinatorial computations based on the weight data items corresponding to the articles respectively charged in said storage hoppers from said weighing machines, for controlling said storage hoppers to discharge the articles forming the optimum weight combination, and for supplying said weighing machines with new articles.

2. A combinatorial weighing apparatus according to claim 1 wherein each of said weighing machines includes a weighing hopper having a discharge gate formed by a pair of gate doors openable laterally in opposite directions.

3. A combinatorial weighing apparatus according to claim 2, wherein:
   the discharge gates of adjacent weighing hoppers of the weighing machines are disposed in confronting relation; and
   each of said storage hoppers is disposed below a position between adjacent weighing hoppers, so that each said storage hopper can be charged with articles from any of the adjacent weighing hoppers thereabove.

4. A combinatorial weighing apparatus according to claim 1 wherein said weighing machines are arranged in a circular pattern with spaced intervals therebetween.

5. A combinatorial weighing apparatus according to claim 4, wherein each of said weighing machines includes a weighing hopper having a discharge gate formed by a pair of gate doors openable laterally in opposite directions.

6. A combinatorial weighing apparatus according to claim 1 wherein said weighing machines are arranged in a noncircular pattern with spaced intervals therebetween.

7. A combinatorial weighing apparatus according to claim 6, wherein each of said weighing machines includes a weighing hopper having a discharge gate formed by a pair of gate doors openable laterally in opposite directions.

8. A combinatorial weighing apparatus according to claim 1 wherein said weighing machines are arranged in straight rows at spaced intervals.

9. A combinatorial weighing apparatus according to claim 8, wherein each of said weighing machines includes a weighing hopper having a discharge gate formed by a pair of gate doors openable laterally in opposite directions.

10. A method of controlling a combinatorial weighing apparatus having a plurality of weighing machines for weighing supplied articles, a plurality of storage hoppers for storing articles weighed and supplied respectively from the weighing machines, and control means for determining an optimum weight combination based on weight data items corresponding to the articles charged in the storage hoppers respectively from the weighing machines, for controlling the storage hoppers to discharge the articles forming the optimum combination, and for supplying the weighing machines with new articles, said method comprising the steps of:
(a) disposing each of the storage hoppers in associated relation to at least two of the weighing machines, so that each of the storage hoppers can be charged with weighed articles from any of the associated at least two weighing machines, and so that each of the weighing machines is capable of supplying the weighed articles into at least two of the storage hoppers;
(b) effecting combinatorial computations based on weight data items corresponding to the articles charged in the storage hoppers to determine an optimum weight combination having a combinatorial total weight equal to a target weight value or closest thereto within an allowable preset range;
(c) controlling the storage hoppers selected as forming the optimum weight combination to discharge the articles therefrom;
(d) controlling the weighing machines to charge weighed articles into the storage hoppers from which the articles have been discharged; and
(e) supplying new articles to the weighing machines from which the weighed articles have been supplied to the storage hoppers.

11. A method according to claim 10, wherein said step (b) comprises effecting combinatorial computations so that three adjacent storage hoppers are not selected as part of the optimum weight combination.

12. A method according to claim 10, wherein said step (d) comprises charging weighed articles into the storage hoppers from the remaining weighing machines which have not charged articles into the storage hoppers in the previous weighing cycle.

13. A combinatorial measuring apparatus comprising:
means for supplying batches of articles;
weighing machines positioned to receive respective batches of articles from said supplying means, said weighing machines for weighing the supplied batches of articles, for generating weight data items respectively corresponding to the batches of articles and for discharging the batches of articles;
storage hoppers, disposed below said weighing machines, for storing the batches of articles which have been weighed and discharged by said weighing machines, each of said weighing machines supplying the weighed articles into at least two of said storage hoppers, each of said storage hoppers being disposed in associated relation to at least two of said weighing machines, so that each of said storage hoppers can be charged with a batch of weighed articles from any of the associated at least two weighing machines;
means for determining an optimum measured combination by performing combinatorial computations based on the weight data items corresponding to the batches of articles charged in said storage hoppers; and
means for controlling said storage hoppers to discharge the batches of articles forming the optimum measured combination.

14. A combinatorial measuring apparatus according to claim 13, wherein each of said weighing machines includes a weighing hopper having a discharge gate formed by a pair of gate doors which are openable laterally in opposite directions.

15. A combinatorial measuring apparatus according to claim 14, wherein:
the discharge gates of adjacent weighing hoppers of said weighing machines are disposed in confronting relation; and
each of said storage hoppers is disposed below a position between adjacent weighing hoppers, so that each said storage hopper can be charged with a batch of articles from any of the adjacent weighing hoppers thereabove.

16. A method of controlling a combinatorial measuring apparatus having weighing machines for weighing batches of supplied articles and having storage hoppers for storing batches of articles weighed and supplied from the weighing machines, comprising the steps of:
(a) disposing each of the storage hoppers in associated relation to at least two of the weighing machines, so that each of the storage hoppers can be charged with a batch of weighed articles from any of the associated at least two weighing machines, and so that each of the weighing machines is capable of supplying the weighed batches of articles into at least two of the storage hoppers;
(b) effecting combinatorial computations based on weight data items corresponding to the weights of the batches of articles charged in the storage hoppers, to determine an optimum measured combination having a total measured value equal to a target value or closest to the target value within an allowable preset range;
(c) controlling the storage hoppers selected as forming the optimum measured combination to discharge the batches of articles therefrom;
(d) controlling the weighing machines to supply weighed batches of articles to the storage hoppers from which the articles have been discharged in said step (c); and
(e) supplying new batches of articles to the weighing machines from which the weighed batches of articles have been supplied to the storage hoppers in said step (d).

* * * * *

UNITED STATES PATENT AND TRADEMARK OFFICE
CERTIFICATE OF CORRECTION

PATENT NO. : 4,614,243
DATED : SEPTEMBER 30, 1986
INVENTOR(S) : TETSUO IKEDA

It is certified that error appears in the above-identified patent and that said Letters Patent is hereby corrected as shown below:

FRONT PAGE, [57] ABSTRACT, line 5, "machines, a" should be --machines. A--.

Col. 1, line 30, "weiging" should be --weighing--.

Col. 2, line 3, delete "on";
      line 10, "corresponding to" should be --on--;
      line 11, "on" should be --corresponding to--;
      line 34, after "articles" insert --they--.

Col. 4, line 37, delete "to".

Col. 6, line 16, "elected" should be --selected--;
      line 68, "10th;" should be --10th;)--.

Col. 7, line 8, "10th," should be --10th, 1st)--;
      line 18, "37 1"" should be --"1"--;
      line 58, "hoppers among from" should be --hoppers, from among--.

Col. 8, line 24, "exmaple" should be --example--;
      line 55, "1" should be --1,--.

UNITED STATES PATENT AND TRADEMARK OFFICE
CERTIFICATE OF CORRECTION

PATENT NO. : 4,614,243

DATED : SEPTEMBER 30, 1986

INVENTOR(S) : TETSUO IKEDA

It is certified that error appears in the above-identified patent and that said Letters Patent is hereby corrected as shown below:

```
Col. 9, line  2, "1" should be --1,--;
        line  9, "1" should be --1,--;
        line 18, "1" should be --1,--.
```

Signed and Sealed this

Sixteenth Day of December, 1986

Attest:

DONALD J. QUIGG

*Attesting Officer*    *Commissioner of Patents and Trademarks*